United States Patent [19]

Parfitt

[11] 4,051,929
[45] Oct. 4, 1977

[54] NON RETURN DEVICE

[75] Inventor: Norman Leslie Cyril Parfitt, Ashby-de-la-Zouch, England

[73] Assignee: Coal Industry (Patents) Limited, London, England

[21] Appl. No.: 723,659

[22] Filed: Sept. 15, 1976

[30] Foreign Application Priority Data

Oct. 31, 1975 United Kingdom ............... 45213/75

[51] Int. Cl.² ........................................... F16D 65/54
[52] U.S. Cl. .................................. 188/196 C; 188/67
[58] Field of Search ............... 188/67, 71.8, 79.5 GT, 188/82.8, 196 C, 196 P, 265; 74/531; 192/111 A

[56] References Cited

U.S. PATENT DOCUMENTS 2,251,379  8/1941  van der Hof ............ 188/196 P UX
2,371,554  3/1945  Scott-Iversen ........... 188/196 A UX
3,828,896  8/1974  Paimen ....................... 188/196 A X

FOREIGN PATENT DOCUMENTS 449,599  7/1948  Canada .............................. 188/196 A Primary Examiner—Duane A. Reger
Attorney, Agent, or Firm—Stevens, Davis, Miller & Mosher

[57] ABSTRACT

A device which in normal use restricts relative movement between two members to one direction. Attempted movement opposite to the one direction causes an hydraulic lock to prevent such attempted movement, which also causes wedges actuated by the hydraulic lock to engage in locking co-operation to prevent the attempted movement instead of or in unison with the hydraulic lock.

9 Claims, 2 Drawing Figures

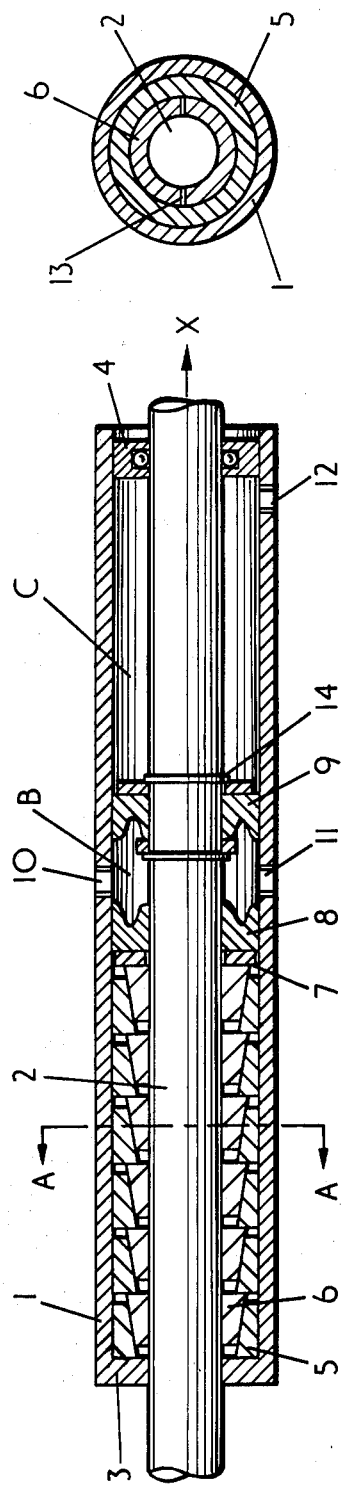

NON RETURN DEVICE

This invention relates to a device which in normal use restricts the relative movement between two members to one directon. The device is particularly useful when applied to equipment such as vehicle clutches and self adjusting brakes.

Known devices of the kind mentioned, referred to as non-return devices, are used for example where a vehicle brake is applied by a spring and released by an opposing force supplied by a fluid medium such as hydraulic fluid or air.

The non-return devices afford an adjusting feature, so that the spring operates over a constant range of movement, regardless of wear on brake shoes employed in the vehicle brake, and the spring consequently can be of a minimum size.

However, such known non-return devices suffer from the disadvantages, deriving from their method of operation and construction, that they are complex, costly to produce and are not easily resettable.

Resettable as used in the present context means that the non return device can be adjusted, when for example the brake shoes are replaced so that the two members are in a desired relative position. The desired relative position lies within the operating range of the non-return device.

An object of the present invention is to tend to overcome these disadvantages by providing a non-return device which is robust and simple in operation and construction, and which when not in normal use is easily resettable.

According to the present invention, a device which in normal use restricts the relative movement between two members to one direction comprises a first of the members able to support the second of the members, at least one wedge shaped element able to grip the second member and means for urging the at least one wedge shaped element to abut a passageway within the first member, to cause locking co-operation between the two members, the means, and the element, the means being actuated by attempted relative movement of the second member in a forbidden direction which is opposite to the said one direction.

Conveniently, the device comprises the first member and the second member.

Advantageously, the first member is a sleeve, adapted to be hydraulically sealed by at least one removable endcap.

Alternatively, one end of the sleeve may terminate in a sealed bore.

Preferably, the second member is a shaft.

Advantageously, the shaft is slidably supported at least at one end by an endcap.

Preferably, the wedge shaped element is a split annulus.

Preferably, the passageway within the first member is defined by a cylindrical bore having an internal taper provided by at least one wedge shaped ring.

The at least one wedge shaped ring co-operates with the at least one split annulus, so that each split annulus co-acts with a respective ring.

Alternatively, the passageway is defined by a tapered bore and the at least one split annulus co-acts with the taper.

Alternatively, the passageway is defined by a bore which is partly tapered and partly cylindrical.

Advantageously, the means for urging the at least one wedge shaped element is hydraulic.

Conveniently, the means for urging the at least one wedge shaped element is resettable when the device is not in normal use.

Conveniently, a device which in normal use restricts the relative movement between two members to one direction comprises a tubular sleeve, an elongated shaft slidably mounted on sealed endcaps terminating the sleeve, resettable hydraulic means mounted within the sleeve, the resettable hydraulic means permitting unidirectional axial movement of the elongated inner shaft, and at least one wedge shaped split annulus and at least one wedge shaped ring, the ring contacting the sleeve and the annulus the shaft, in use the friction angle of wedges of the wedge shaped annuli and rings allowing relative axial movement of the shaft except when the wedges are urged together by the hydraulic means with which they then work in unison to prevent movement of the shaft in one axial direction, one annulus and one ring co-acting as a pair.

Advantageously, the resettable hydraulic means comprises a pair of gland seals, one of which is in contact with the one of the annuli and the other of which is fixedly attached to the shaft, so as to form an annular chamber between the seals, and an annular gap between the attached seal and the endcap away from the annuli, the volume of the chamber and gap being changed by the unidirectional movement of the shaft.

Conveniently, the chamber and the gap are filled with grease through pluggable holes in the tubular sleeve.

By way of example only, one form of device constructed in accordance with the invention is described below with reference to the accompanying drawings in which:

FIG. 1 is a side elevation of the device, and

FIG. 2 is a sectional view along AA of FIG. 1.

In normal use of vehicle brakes and clutches, especially those applied by a spring, it is desirable that a self-adjusting feature is supplied. The self-adjusting feature on a brake obviates the need for a spring which can apply a uniform force throughout the life of brake shoes in the brake, since the extra travel caused by the worn brake shoes is taken up by the self-adjusting feature. The self-adjusting feature is provided by a device which in normal use restricts the relative movement between two members to one direction. Such a device according to the present invention is now described with reference to the figures.

Referring to FIG. 1, a sleeve 1 carries within it a shaft 2 slidably supported co-axially by endcaps 3 and 4 which are suitably sealed. At one end of sleeve 1 is a plurality of wedge shaped rings 5, concentric with the shaft 2 and slidably locating with the internal bore of the sleeve 1. Also at the same end of sleeve 1 is the same number of wedge shaped annuli 6, which are split along any diameter 13 (see FIG. 2) and said annuli are concentric with and slidably located on the shaft 2. Referring back to FIG. 1, it will be seen that the split annuli mate with the rings 5 because the inner taper of the wedges on the rings matches the outer taper of the wedges on the split annuli. The wedge angles are machined so as to be as close as possible to, but not less than, the friction angle between the annuli and the shaft. The series of annuli and rings is terminated at one end by the endcap 3 and at the other by a washer 7 and gland seal 8 which are also slidably located on shaft 2. A further gland seal 9 is fixedly located by circlips 14 on shaft 2. Ports 10, 11 are provided in the sleeve 1 so that a chamber B, which is the annular space between seals 8 and 9, may be filled with grease which constitutes an hydraulic fluid. A further port 12 is provided so that a chamber C, which is the annular gap between the seal 9 and the endcap 4 may also be filled with grease. The ports 10, 11, 12 are plugged after the chambers have been filled with grease.

The device operates as follows:

With the sleeve 1 securely fixed, to for example a component (not shown) of the previously mentioned brake, the shaft 2, which is securely fixed to a further component (not shown) of the previously mentioned brake, is moved during normal operation of the brake in a permitted direction indicated by the arrow X, causing the volume of chamber B to increase and of chamber C to decrease. The pressure thereby created in chamber C causes grease to be transferred from chamber C into chamber B over the lip of the fixed seal 9. The rings 5 and split annuli 6 are moved apart from locking engagement by frictional force exerted on the annuli by the shaft and consequently the shaft is allowed to pass. If the shaft 2 now attempts to move in the forbidden direction opposite to X, then an hydraulic lock is formed by seal 9, in chamber B preventing such movement, since grease is prevented from transferring from chamber B to chamber C by the seal 9. The force applied against the hydraulic lock is also transmitted through washer 7 onto the endmost of the split annuli 6. This annulus transmits the force to the adjacent ring which in turn transmits the force to the next annulus. The annuli 6 are thus urged onto the rings 5. Since the endcap 3 prevents the ring closest to it moving in a direction opposite to X, the annuli 6 are wedged between the shaft 2 and rings 5. This wedging action causes locking co-operation and is sufficient to prevent movement opposite to X, even should the hydraulic lock fail as described later in the specification.

However, since the wedge angle of the rings is equal to or slightly greater than the friction angle between the shaft and annuli, movement in the forbidden direction opposite to X would, without the original application of force applied against the hydraulic lock, occur without hindrance.

When the fixed seal 9 has moved to the endcap 4, during normal operation of the previously mentioned brake, the total movement in the permitted direction X has been used. To reset the device, the ports 10, 11, 12 are opened and the grease is transferred from the chamber B to the chamber C.

This transfer may be by means (not shown) such as a valve in a grease filled tube connecting the chamber B and C. As previously mentoned, without application of force applied against the hydraulic lock, the annuli and rings do not lock, and not in consequence impair resetting.

It will be understood that in normal operation of the device comprising the present invention, the gland seals are unable to provide a perfect seal. Consequently, during prolonged use, a quantity of grease, small in comparison with the total quantity of grease within the device, will leak from chamber B to chamber C. However, as mentioned previously, the device will not fail since the shaft 2 remains in locking co-operation with the sleeve 1, the rings 5 and the annuli 6. When the shaft 2 moves further in the direction X, then more grease moves into chamber B from chamber C, so that the hydraulic lock is reformed.

In alternative embodiments of the invention, the wedging action is provided by one ring and one annulus or by any convenient number of rings and annuli.

In further alternative embodiments, the taper of the sleeve or bore in the sleeve co-acting with the annuli affords a similar wedging action to the rings above.

From the above description it can be seen that a device which in normal use restricts the relative movement of two members to one direction and which is robust and simple in operation is provided.

I claim:

1. A device which in normal use restricts the relative movement between two members to one direction comprising, a first of the members able to support the second of the members, at least one wedge shaped element positioned to grip the second member, and urging means to urge said at least one wedge shaped element to abut a passageway within the first member to cause locking co-operation between the two members, the element and the urging means, the urging means being actuated by attempted relative movement of the members in a forbidden direction opposite to the said one direction.

2. A device as claimed in claim 1, wherein the passageway within the first member is defined by a cylindrical bore having an internal taper provided by at least one wedge shaped ring.

3. A device as claimed in claim 2, wherein said at least one wedge shaped element comprises a split annulus, and said at least one wedge shaped annulus abuts a respective wedge shaped ring, when urged into locking co-operation by the urging means.

4. A device as claimed in claim 1, wherein the urging means are hydraulic.

5. A device as claimed in 4, wherein the urging means comprises a pair of gland seals adapted to let hydraulic fluid enter between them but to prevent hydraulic fluid escaping from between them.

6. A device which in normal use restricts the relative movement between two members to one direction comprising a tubular sleeve, an elongated shaft slidable through sealed endcaps terminating the sleeve, resettable hydraulic means mounted within the sleeve, the resettable hydraulic means permitting unidirectional axial movement of the elongated inner shaft, and at least one wedge shaped split annulus and at least one wedge shaped ring, said ring contacting the sleeve and said annulus contacting the shaft, the friction angle of the wedge shaped annuli and rings allowing relative axial movement of the shaft except when the wedges are urged together by the hydraulic means with which they then work in unison to prevent movement of the shaft in one axial direction.

7. A device as claimed in claim 6, wherein the resettable hydraulic means comprises a pair of gland seals, one of which is in contact with the one of the annuli and the other of which is fixedly attached to the shaft so as to form an annular chamber between the seals, and an annular gap between the attached seal and the endcap away from the annuli, the volume of the chamber and gap being changed by the unidirectional movement of the shaft.

8. A device as claimed in claim 7, wherein the chamber and the gap are filled with grease through pluggable holes in the tubular sleeve.

9. A device for self adjustment to compensate for the wear in brake shoes comprising an elongated hollow outer first member and an elongated second member within said first member, means to permit relative axial movement between the members in one direction and to prevent relative axial movement in the opposite direction comprising:
- a. at least one wedge shaped element between the first and second members;
- b. at least one projection from one of the members extending into the space between the members, said projection having an outer surface at an angle to co-operate with said wedge shaped member;
- c. urging means to urge said wedge shaped element to abut both the outer surface of said projection and the member not having said projection, a pair of seals axially spaced from each other defining a first closed space between them, the first seal being carried by the member not having projections and the second seal being positioned to contact said wedge shaped element, a second closed space adjacent the first seal on the side opposite the first closed space so that as the first member moves axially relative to the second member fluid will leak past the first seal from the second to the first closed space and the fluid pressure in the first closed space will force the second seal into contact with the wedge shaped element, causing it to abut both the outer surface of said projection and the member not having said projection, thus preventing movement in the opposite axial direction.

* * * * *